US010845625B2

(12) United States Patent
Carrega et al.

(10) Patent No.: US 10,845,625 B2
(45) Date of Patent: Nov. 24, 2020

(54) OPTICAL ARTICLE PROTECTING FROM BLUE LIGHT

(71) Applicant: ESSILOR INTERNATIONAL, Charenton-le-Pont (FR)

(72) Inventors: Aude Carrega, Charenton-le-Pont (FR); Armel Jimenez, Charenton-le-Pont (FR); Franck Lestournelle, Charenton-le-Pont (FR); Amélie Kudla, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 212 days.

(21) Appl. No.: 15/773,478

(22) PCT Filed: Nov. 6, 2015

(86) PCT No.: PCT/IB2015/002252
§ 371 (c)(1),
(2) Date: May 3, 2018

(87) PCT Pub. No.: WO2017/077357
PCT Pub. Date: May 11, 2017

(65) Prior Publication Data
US 2018/0321513 A1 Nov. 8, 2018

(51) Int. Cl.
G02C 7/10 (2006.01)
G02B 5/20 (2006.01)
G02B 5/22 (2006.01)
G02B 1/16 (2015.01)
G02B 1/116 (2015.01)
G02B 1/115 (2015.01)
G02B 5/28 (2006.01)

(52) U.S. Cl.
CPC .............. G02C 7/104 (2013.01); G02B 1/115 (2013.01); G02B 1/116 (2013.01); G02B 1/16 (2015.01); G02B 5/208 (2013.01); G02B 5/223 (2013.01); G02C 7/108 (2013.01); G02B 5/28 (2013.01)

(58) Field of Classification Search
None
See application file for complete search history.

(56) References Cited

U.S. PATENT DOCUMENTS

| 4,528,311 | A | 7/1985 | Beard et al. |
| 7,452,611 | B2 | 11/2008 | Blackburn et al. |
| 9,057,887 | B1 | 6/2015 | Jaglan |
| 2003/0020869 | A1 | 1/2003 | Leclaire et al. |
| 2008/0094566 | A1* | 4/2008 | Ishak ..................... G02C 7/104 351/44 |
| 2008/0127432 | A1 | 6/2008 | Burguiere et al. |
| 2008/0186448 | A1 | 8/2008 | Ishak et al. |
| 2009/0047424 | A1 | 2/2009 | Momma |
| 2011/0075096 | A1 | 3/2011 | Ishak et al. |
| 2011/0157546 | A1 | 6/2011 | Ishak et al. |
| 2012/0008217 | A1 | 1/2012 | Ishak et al. |
| 2013/0244045 | A1 | 9/2013 | Song et al. |
| 2014/0093661 | A1 | 4/2014 | Trajkovska et al. |
| 2014/0300857 | A1 | 10/2014 | Cohen-Tannoudji et al. |
| 2014/0320806 | A1 | 10/2014 | Cohen-Tannoudji et al. |
| 2015/0002809 | A1 | 1/2015 | Cohen-Tannoudji et al. |
| 2015/0098058 | A1 | 4/2015 | De Ayguavives et al. |
| 2015/0103310 | A1 | 4/2015 | De Ayguavives et al. |
| 2015/0134033 | A1 | 5/2015 | Tapper et al. |
| 2015/0146166 | A1 | 5/2015 | Weber et al. |
| 2015/0153489 | A1 | 6/2015 | Gallas et al. |
| 2015/0234208 | A1 | 8/2015 | De Ayguavives et al. |
| 2015/0316688 | A1* | 11/2015 | Cefalo ..................... G02B 1/14 252/586 |
| 2016/0115072 | A1* | 4/2016 | Cid-Aguilar ............ C03C 3/087 428/220 |
| 2018/0067338 | A1* | 3/2018 | Hofener ................... G02C 7/10 |

FOREIGN PATENT DOCUMENTS

| AU | 2013328478 | 4/2014 |
| CN | 104303096 | 1/2015 |
| CN | 104375285 | 2/2015 |
| CN | 104597621 | 5/2015 |
| CN | 204422892 | 6/2015 |
| CN | 104749660 | 7/2015 |
| CN | 204462431 | 7/2015 |
| EP | 2859867 | 4/2015 |
| FR | 2990774 | 11/2013 |

(Continued)

OTHER PUBLICATIONS

Citek "Anti-reflective coatings reflect ultraviolet radiation," *Optometry*, 79:143-148, (2008).
International Search Report and Written Opinion issued in International Patent Application No. PCT/IB2015/002252, dated Jul. 14, 2016.
Office Action Issued in Corresponding Chinese Patent Application No. 2015800843151, dated Sep. 27, 2019.
Office Action Issued in Corresponding Japanese Patent Application No. 2018-541580, dated Oct. 8, 2019.

Primary Examiner — William R Alexander
Assistant Examiner — Gary W O'Neill
(74) Attorney, Agent, or Firm — Norton Rose Fulbright US LLP

(57) ABSTRACT

The present invention relates to an optical article comprising a substrate with a front main face and a rear main face, having a colorimetric coefficient b* as defined in the CIE (1976) L*a*b* international colorimetric system that is lower than or equal to 4, a relative light transmission factor in the visible spectrum Tv higher than or equal to 87%, and blocking at least 8% of light having a wavelength ranging from 420 to 450 nm arriving on said front main face. This optical article can be used to protect the eyes of a user from phototoxic blue light.

16 Claims, No Drawings

(56) References Cited

FOREIGN PATENT DOCUMENTS

| | | |
|---|---|---|
| JP | 2015007695 | 1/2015 |
| JP | 2015017152 | 1/2015 |
| JP | 2015087690 | 5/2015 |
| JP | 2015118122 | 6/2015 |
| WO | WO 2014/133111 | 2/1917 |
| WO | WO 2008/024414 | 2/2008 |
| WO | WO 2012/076714 | 6/2012 |
| WO | WO 2013/098531 | 7/2013 |
| WO | WO 2013/171434 | 11/2013 |
| WO | WO 2013/171435 | 11/2013 |
| WO | WO 2013/171436 | 11/2013 |
| WO | WO 2014/055513 | 4/2014 |
| WO | WO 2015/093093 | 6/2015 |
| WO | WO 2015/097186 | 7/2015 |
| WO | WO 2015/097492 | 7/2015 |

\* cited by examiner

OPTICAL ARTICLE PROTECTING FROM BLUE LIGHT

CROSS-REFERENCE TO RELATED APPLICATIONS

This application is a national phase application under 35 U.S.C. § 371 of International Application No. PCT/IB2015/002252 filed 6 Nov. 2015, the entire contents of which is specifically incorporated by reference herein without disclaimer.

The present invention relates to the optics field, more particularly to an optical article, preferably an ophthalmic lens, having preferably a low level of yellowness, in particular a mostly colorless appearance and being perceived as having a good transparency, while comprising an optical means for blocking at least part of the phototoxic blue light and optionally protecting from UV light.

Visible light as perceived by humans approximately extends over a spectrum ranging from a 380 nm wavelength to a 780 nm wavelength, and more specifically from 400 to 700 nm. The part of this spectrum, ranging from around 380 nm to around 500 nm, does correspond to a high-energy, essentially blue light.

Many studies (see for example Kitchel E., "The effects of blue light on ocular health", Journal of Visual Impairment and Blindness Vol. 94, No. 6, 2000 or Glazer-Hockstein and al., Retina, Vol. 26, No. 1. pp. 1-4, 2006) suggest that part of the blue light has phototoxic effects on human eye health, and especially on the retina.

ISO 8980-3 standard:2003 (E) Table B1, defines the B($\lambda$) blue light dangerousness function.

Ocular photobiology studies (Algvere P. V. and al., "Age-Related Maculopathy and the Impact of the Blue Light Hazard", Acta Ophthalmo. Scand., Vol. 84, pp. 4-15, 2006) and clinical trials (Tomany S. C. and al., "Sunlight and the 10-Year Incidence of Age-Related Maculopathy. The Beaver Dam Eye Study", Arch Ophthalmol., Vol. 122. pp. 750-757, 2004) demonstrated that an excessively prolonged or intense exposure to blue light may induce severe ophthalmic diseases such as age-related macular degeneration (ARMD) or cataract.

Another recent publication Arnault E., Barrau C., Nanteau, C. Gondouin P., Bigot K., Vienot F., Gutman E., Fontaine V., Villette T., Cohen-Tannoudji D., Sahel J. A., Picaud S.:

"Phototoxic action spectrum on a retinal pigment epithelium model of age related macular degeneration exposed to sunlight normalized conditions", Aug. 23, 2013, PLOS One. 2013 Aug. 23; 8(8):e71398. doi: 10.1371/journal.pone.0071398. eCollection 2013 defined the precise spectrum of light retinal toxicity in physiological irradiance conditions on an in vitro model of age-related macular degeneration using primary cultures of porcine retinal pigment epithelium cellsincubated for 6 hours with different concentrations of a photosensitive derivative of the visual pigment, N-retinylidene-N-retinylethanolamine (A2E).

Thus, it is recommended to limit the exposure to blue light potentially harmful, in particular as regards the wavelength band with an increased dangerousness described in the above documents.

To that end, it may be advisable for a spectacle wearer to wear before each of both eyes an ophthalmic lens that prevents or limits the phototoxic blue light transmission to the retina. Such lenses may also provide increased visual performance due to increased contrast sensitivity.

It has already been suggested, for example in the patent application WO 2008/024414, to cut at least partially the troublesome part of the blue light spectrum from 400 nm to 460 nm, by means of lenses comprising a film partially inhibiting the light in the suitable wavelength range, through absorption or through reflection. This can also be done by incorporating a yellow absorbing dye into the optical element.

The U.S. Pat. No. 8,360,574 discloses an ophthalmic lens comprising a selective light wavelength filter that blocks 5-50% of light having a wavelength in the range of 400-460 nm, transmits at least 80% of light having a wavelength in the range of 460-700 nm, and exhibits a yellowness index of no more than 15.

The application WO 2014/133111 discloses an optical material containing one or more ultraviolet absorbers having a maximum absorption peak in a range from 350 nm to 370 nm, which is configured to restrict exposure of the eyes of a user to blue light with relatively short wavelengths, specifically in the 400 to 420 nm wavelength range.

The application WO 2013/084177 describes an optical device comprising an optical substrate provided with selective optical filtering means configured to selectively inhibit transmission, through the optical substrate, of at least one selected range of wavelengths, having a bandwidth in a range of from 10 nm to 70 nm centered on a wavelength between 430 nm and 465 nm, of incident light in the visible light spectrum at an inhibition rate of at least 5%, the selective optical filtering means being further configured to transmit at least 8% of incident light of the visible spectrum outside said at least one selected range of wavelengths.

Lenses with an antireflection coating partially rejecting harmful blue visible light have been launched on the market. They maintain a high level of transmission (higher than 97%) because their antireflection coating has a low reflectance in the visible range. At this level of transparency, the wearer is sensitive to a small loss of transmission, and the current trend is to increase transmission, i.e., transparency.

In view of the foregoing, there is a need for an optical article capable of at least partially blocking the harmful blue light and in some instances protecting from the harmful UV light, while keeping a good transparency and aesthetic based on the user's or wearer's perception.

It is also desirable that the optical article selectively blocks a relatively narrow range of the blue spectrum, i.e., only blocks the part of the blue spectrum that is harmful to the eye, and exhibits a low level of yellowness. The optical article should be perceived as mostly colorless by an external observer.

Another objective, when the optical article is an ophthalmic system, is to obtain both satisfactory wearer protection against harmful wavelengths and wearer satisfaction. In this regard, the optical article should provide a high comfort to the wearer in terms of visibility and preferably has antidazzling property and/or contrast improvement. An acceptable overall level of light transmission is also needed, as well as acceptable color perception for a user, i.e., the optical article should not impair dramatically the wearer's color vision.

The present inventors found that these objectives can be achieved by providing an optical article with a lower transmission, but in return, having an improved yellowness level, i.e., a reduced yellowness level for light transmitted through the optical article. This finding is opposite to general knowledge in the ophthalmic optics field, in which it is usually considered that the best transparent lens is the lens with the highest transmission. In fact, the experimental part demonstrates that the lenses having the higher notation by users in term of transparency are those having the lowest yellow residual tint, even though they present a lower transmittance in the visible spectrum to achieve this result.

The unexpected finding that a wearer was much more sensitive to an increase of color than to a decrease of transmittance led the present inventors to propose new optical articles.

To address the needs of the present invention and to remedy to the mentioned drawbacks of the prior art, the applicant provides an optical article comprising a substrate with a front main face and a rear main face, having a colorimetric coefficient b* as defined in the CIE (1976) L*a*b* international colorimetric system that is lower than or equal to 4, a relative light transmission factor in the visible spectrum Tv higher than or equal to 87%, and blocking at least 8% of light having a wavelength ranging from 420 to 450 nm arriving on said front main face.

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating that is "on" a substrate/coating or which has been deposited "onto" a substrate/coating is defined as a coating that (i) is positioned above the substrate/coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When "a coating 1 is said to be located under a coating 2", it should be understood that coating 2 is more distant from the substrate than coating 1.

In the present description, unless otherwise specified, an optical article is understood to be transparent when the formation of an image through said optical article is perceived by a wearer and/or observer without adversely affecting the quality of the image. This definition of the term "transparent" can be applied to all objects qualified as such in the description, unless otherwise specified.

The optical article according to the invention is preferably a transparent optical article, in particular an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal, progressive lenses and Fresnel lenses. Although ophthalmic optics is a preferred field of the invention, it will be understood that this invention can be applied to optical elements of other types where filtering blue wavelengths may be beneficial, such as, for example, lenses for optical instruments, filters particularly for photography or astronomy, optical sighting lenses, ocular visors, optics of lighting systems, screens, glazings, etc.

The optical article preferably comprises a substrate and at least one layer coated on the substrate. If it is an optical lens, it may be coated on its front main surface, rear main side, or both sides. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for the stack of one or more coatings or layers.

The substrate of the article of the invention may be a mineral or an organic substrate, for instance an organic substrate made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene terephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol-A, (meth) acrylic or thio(meth)acrylic polymers and copolymers such as poly methyl methacrylate (PMMA), urethane and thiourethane polymers and copolymers, epoxy polymers and copolymers, episulfide polymers and copolymers.

The optical article according to the invention blocks or cuts at least 8% of the light having a wavelength ranging from 420 to 450 nm arriving on said front main face, preferably at least 12%. In the present application, "blocking X %" of incident light in a specified wavelength range does not necessarily mean that some wavelengths within the range are totally blocked, although this is possible. Rather, "blocking X %" of incident light in a specified wavelength range means that an average of X % of said light within the range is not transmitted. As used herein, the light blocked in this way is light arriving on the front main face of the optical article.

This attenuation of the electromagnetic spectrum at wavelengths in the above-specified range may be at least 20%; or at least 30%; or at least 40%; or at least 50%; or at least 60%; or at least 70%; or at least 80%; or at least 90%; or at least 95%; or at least 99%; or 100%. In one embodiment, the amount of light having a wavelength ranging from 420 to 450 nm blocked by the optical article ranges from 8 to 50%, more preferably from 10 to 40%, even more preferable from 12 to 30%.

The optical article according to the invention has a relative light transmission factor in the visible spectrum Tv higher than or equal to one of the following values: 87%, 88%, 89% preferably higher than or equal to 90%, more preferably higher than or equal to 92%, and better higher than or equal to 95%. Said Tv factor preferably ranges from 87% to 98.5%, more preferably from 87% to 97%, even better from 87% to 96%. In another embodiment, Tv ranges from 89% to 98%, preferably from 90% to 97%.

Preferably, and in a general manner said Tv value is lower than 99%, preferably lower than or equal to 98.5%, even better lower than or equal to 98%. In another preferred embodiment, Tv is lower than or equal to 97.5%, and better lower than or equal to 97%.

The Tv factor, also called "luminous transmission" of the system, is such as defined in the standard NF EN 1836 and relates to an average in the 380-780 nm wavelength range that is weighted according to the sensitivity of the eye at each wavelength of the range and measured under D65 illumination conditions (daylight).

The optical article according to the invention has a colorimetric coefficient b* as defined in the CIE (1976) L*a*b* international colorimetric system that is lower than or equal to 4, preferably lower than or equal to 3.5, more preferably lower than or equal to 3, and even better lower than equal to 2.5 and in a general manner higher or equal to 0. The low colorimetric coefficient b* of the optical article can be correlated with its limited or non yellow appearance. Indeed, positive values on the b* axis indicate amounts of yellow, while negative values indicate amounts of blue.

The optical article according to the invention has a colorimetric coefficient a* as defined in the CIE (1976) L*a*b* international colorimetric system that is preferably higher than or equal to −5 and less than 1, and preferably ranges from −5 to −1, preferably from 0 to −2.5. The foregoing colorimetric coefficients are calculated between 380 and 780 nm for light transmitted through the optical lens at an angle of incidence ranging from 0° to 15°, especially 0°, using standard observer 10° and standard illuminant D65.

In some embodiments, the optical article comprises at least one optical filtering means that at least partially blocks incident light having a wavelength ranging from 420 to 450 nm (within blue light range), i.e., inhibits transmission in the phototoxic spectral range through at least one geometrically defined surface of the substrate of the optical article, preferably an entire main surface. In the present description, unless otherwise specified, light blocking is defined with reference to an angle of incidence ranging from 0° to 15°, preferably 0°.

According to the invention, the angle of incidence is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range of angles of incidence is from 0° to 75°.

In the present description, the optical filtering means can be an absorptive filter that blocks light transmission by absorption, an interferential filter that blocks light transmission for example by reflection, or a combination of both (i.e., a filter that is both absorptive and interferential). The optical article may also comprise at least one absorptive filter and at least one interferential filter that both at least partially block incident light having a wavelength ranging from 420 to 450 nm. Using an interferential filter in addition to an absorptive filter may improve the aesthetic of the optical article.

In another embodiment, the optical article comprises at least one interferential filter that at least partially blocks incident light having a wavelength ranging from 420 to 450 nm on at least one geometrically defined surface of the substrate of the optical article, preferably an entire main surface, within a first selected range of angles of incidence. The interferential filter, preferably a filter that inhibits light transmission by reflection in the 420-450 nm range, is generally a multi-layer dielectric stack, typically fabricated by depositing discrete layers of alternating high and low refractive index materials. Design parameters such as individual layer thickness, individual layer refractive index, and number of layer repetitions determine the performance parameters for multi-layer dielectric stacks. Such interferential filter inhibiting light in the 420-450 nm range is disclosed, for example, in the application WO 2013/171434 and WO2013/171435, in the name of the applicant, incorporated by reference.

In a preferred embodiment, the optical article comprises at least one absorptive filter. In this case, the optical filtering means can be selected from an absorbing dye and/or an UV absorber. As used herein, a dye may refer to both a pigment and a colorant, i.e., can be respectively insoluble or soluble in its vehicle.

Preferred absorptive filters have a narrow absorption band in the 420-450 nm range of the electromagnetic spectrum. Ideally, said absorption band is centered on around 430 nm. They preferably do not absorb, or very little (typically less than 5%), in regions of the visible spectrum outside the 410-450 nm wavelength range.

Preferably, the optical filtering means selectively inhibits light within the 420 nm-450 nm range. As used herein, a means "selectively inhibits" a wavelength range if it inhibits at least some transmission within the 420-450 nm range, while having little or no effect on transmission of visible wavelengths outside the wavelength range, unless specifically configured to do so.

Indeed, the optical filtering means may be configured to inhibit, to a certain degree, transmission of incident light of wavelengths outside the 420-450 nm range, usually by absorption.

In some cases, it may be particularly desirable to selectively filter a relatively small portion of the blue spectrum, i.e., the 420 nm-450 nm region. Indeed, blocking too much of the blue spectrum can interfere with scotopic vision and mechanisms for regulating biorhythms, referred to as "circadian cycles". In this embodiment, the optical filtering means selectively blocks the phototoxic blue light and transmits the blue light implicated in circadian rhythms.

Preferably, the optical article transmits at least 95% of light having a wavelength ranging from 465 to 495 nm. This transmittance is an average of light transmitted within the 465-495 nm range that is not weighted according to the sensitivity of the eye at each wavelength of the range. In another embodiment, the optical filtering means does not absorb light in the 465-495 nm range, preferably the 450-550 nm range.

In a preferred embodiment, the optical filtering means is configured such that the optical transmittance of the optical article is satisfying at least one of the characteristics (1) to (3) below and preferably these three characteristics:

(1) the optical transmittance at the 435 nm wavelength is 10% or less;

(2) the optical transmittance at the 450 nm wavelength is 70% or less;

(3) the optical transmittance at the 480 nm wavelength is 80% or more.

In the case of an absorptive filter, such characteristics can be attained by using appropriate absorbing dyes and/or UV absorbers at a suitable concentration.

In the present description, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0°. As used herein, the light transmitted refers to light arriving on the front main face of the optical article and that went through the lens.

The chemical nature of the absorbing dye that may act as a means for at least partially inhibiting light having a wavelength ranging from 420 to 450 nm is not particularly limited, provided that it has an absorption peak, ideally a maximum absorption peak, within the 420-450 nm range. The FWHM (Full Width at Half Maximum) is preferably lower than 40 nm, preferably lower than 30 nm.

The blue light blocking absorbing dyes, typically yellow dyes, may include one or more dyes from the group consisting of: auramine 0; coumarin 343; coumarin 314; nitrobenzoxadiazole; lucifer yellow CH; 9,10-bis(phenylethynyl)anthracene; proflavin; 4-(dicyanomethylene)-2-methyl-6-(4-dimethylaminostyryl)-4H-pyran; 2-[4-(dimethylamino)styryl]-1-methypyridinium iodide, lutein and zeaxanthin.

In embodiments, the absorbing dye comprises one or more porphyrins, porphyrin complexes, other heterocycles related to porphyrins, including corrins, chlorins and corphins, derivatives thereof, or the perylene, coumarin, acridine, indolenin (also known as 3H-indole) and indol-2-ylidene families. Derivatives are substances generally issued by an addition or substitution.

Porphyrins are well-known macrocycle compounds composed of four modified pyrrole subunits interconnected at their carbon atoms via methine bridges. The parent porphyrin is porphine and substituted porphines are called porphyrins. Porphyrins are the conjugate acids of ligands that bind metals to form (coordination) complexes.

Certain porphyrins or porphyrin complexes or derivatives are interesting in that they provide selective absorption filters having a bandwidth in some cases of for example 20 nm in the selected range of wavelengths. The selectivity property is in part provided by the symmetry of the molecules.

For example the one or more porphyrins or porphyrin complexes or derivatives are selected from the group consisting of Chlorophyll a; Chlorophyll b; 5,10, 15,20-tetrakis (4-sulfonatophenyl) porphyrin sodium salt complex; 5,10, 15,20-tetrakis(N-alkyl-4-pyridyl) porphyrin complex; 5,10, 15,20-tetrakis(N-alkyl-3-pyridyl) porphyrin complex, and 5,10,15,20-tetrakis(N-alkyl-2-pyridyl) porphyrin complex, the alkyl being preferably an alkyl chain, linear or branched, comprising 1 to 4 carbon atoms per chain. For example the alkyl may be selected from the group consisting of methyl, ethyl, butyl and propyl.

The complex usually is a metal complex, the metal being selected from the group consisting of Cr(III), Ag(II), In(III), Mn(III), Sn(IV), Fe (III), Co (II), Mg(II) and Zn(II). Cr(III), Ag(II), In(III), Mn(III), Sn(IV), Fe (III), Co (II) and Zn(II) demonstrate absorption in water in the range of 425 nm to 448 nm with sharp absorption peaks. Moreover, the complexes they provide are stable and not acid sensitive. Cr(III), Ag(II), In(III), Sn(IV), Fe (III), in particular, do not exhibit fluorescence at room temperature which is a useful property in optical lenses such as ophthalmic lenses.

In some embodiments the one or more porphyrins or porphyrin complexes or derivatives are selected from the group consisting of magnesium meso-tetra(4-sulfonatophenyl) porphine tetrasodium salt, magnesium octaethylporphyrin, magnesium tetramesitylporphyrin, octaethylporphyrin, tetrakis (2,6-dichlorophenyl) porphyrin, tetrakis (o-aminophenyl) porphyrin, tetramesitylporphyrin, tetraphenylporphyrin, zinc octaethylporphyrin, zinc tetramesitylporphyrin, zinc tetraphenylporphyrin, and diprotonated-tetraphenylporphyrin.

In one embodiment, the optical filtering means at least partially blocking light having a wavelength ranging from 420 to 450 nm is an UV absorber. Such compounds are frequently incorporated in optical articles in order to reduce or prevent UV light from reaching the retina (in particular in ophthalmic lens materials). The UV absorber that may be used in the present invention preferably has the ability to at least partially block light having a wavelength shorter than 400 nm, preferably UV wavelengths below 385 or 390 nm, but also has an absorption spectrum extending to the visible blue light range (400-500 nm). Most preferred ultraviolet absorbers have a maximum absorption peak in a range from 350 nm to 370 nm and/or do not absorb light in the 465-495 nm range, preferably the 450-550 nm range.

Said UV absorbers both protect the user's eye from UV light and the substrate material itself, thus preventing it from weathering and becoming brittle and/or yellow.

The UV absorber is preferably a benzotriazole compound. Suitable UV absorbers include without limitation 2-(2-hydroxyphenyl)-benzotriazoles such as 2-(2-hydroxy-3-t-butyl-5-methylphenyl) chlorobenzotriazole, 2-(2'-hydroxy-5'-t-octylphenyl) benzotriazole, 2-(3'-methallyl-2'-hydroxy-5'-methyl phenyl) benzotriazole or other allyl hydroxymethylphenyl benzotriazoles, 2-(3,5-di-t-amyl-2-hydroxyphenyl) benzotriazole, and the 2-hydroxy-5-acryloxyphenyl-2H-benzotriazoles disclosed in U.S. Pat. No. 4,528,311 and also Tinuvin® CarboProtect® from BASF. Preferred absorbers are of the benzotriazole family. Commercially available products include Tinuvin 326 from BASF, Seeseorb 703 from Cipro, Viosorb 550 from Kyodo Chemicals, and Kemisorb 73 from Chemipro, Tinuvin® CarboProtect®.

The UV absorber is preferably used in an amount representing from 0.3 to 2% of the weight of the substrate.

According to a preferred embodiment, the optical filtering means absorbs radiation such that at least 8% of the light having a wavelength ranging from 420 to 450 nm arriving on said front main face is blocked/inhibited, preferably at least 12%, and generally 8 to 50%, more preferably from 10 to 50%, more preferably 12 to 50%, 13 to 50%, 14 to 50%, of said light. These levels of light inhibition by absorption can be controlled by adjusting the concentration of the absorbing dye and/or UV absorber and are expressed relative to the amount of light that would be transmitted at the same wavelength range in the absence of the optical filtering means.

Generally, blocking undesirable blue light wavelengths affects color balance, color vision if one looks through the optical device, and the color in which the optical device is perceived. Indeed, blue light-blocking optical devices incorporating at least one of the above described absorptive optical filtering means that at least partially inhibits light having a wavelength ranging from 420 to 450 nm tend to produce a color tint in the optical article as a "side effect", the latter appearing yellow, brown or amber. This is esthetically unacceptable for many optical applications, and may interfere with the normal color perception of the user if the device is an ophthalmic lens.

In order to compensate for the yellowing effect of the blue light blocking filter and obtaining an optical article having a cosmetically acceptable appearance when viewed by an external observer, in particular perceived as mostly color neutral, the optical article comprises, in one embodiment, at least one color-balancing component, when obtaining a colorless appearance is desired.

In one embodiment, the color-balancing component employed to at least partially offset the yellowing effect is a dye, preferably an absorbing dye such as a blue tinting dye, or a mixture of dyes used in suitable proportions, such as a combination of red and green tinting dyes.

Examples of suitable fixed-tint colorants can include, any of the art recognized inorganic and organic pigments and/or dyes. Organic dyes can be selected from azo dyes, polymethyne dyes, arylmethyne dyes, polyene dyes, anthracinedione dyes, pyrazolone dyes, anthraquinone dyes, auinophtalone dyes and carbonyl dyes. Specific examples of such organic dyes include Blue 6G, Violet PF and Magenta RB available from Keystone Aniline, Morplas Blue from Morton International, Inc., D&C Violet #2 available from Sensient Corp., Macrolex Violet 3R from Lanxess, and Rubine Red from Clariant Corporation. Also suitable are laser dyes, for example those selected from pyrromethene, fluoroscein, rhodamine, malachit green, oxazine, pyridine, carbazine, carbocyanine iodide, and others. Specific examples include ABS 574, ABS 668 or ABS 674 from Exiton, Inc.; or SDA2443, SDA3572 or ADA4863 available from H.W. Sands Corp. Mixtures of any of the aforementioned dyes can be used.

Color balancing dyes are typically incorporated in a color-balancing coating or film applied on the surface of the optical article, such as a primer coating, hard coat or antireflection coating or in the optical article.

In another embodiment, an optical brightener, also called fluorescent whitening agent (FWA), optical brightening agent (OBA) or fluorescent brightening agent (FBA) is used.

As well known, optical brighteners are substances that absorb light in the UV and violet region (usually at 340-370 nm) and emit light by fluorescence mainly in the blue region of the visible spectrum (400-460 nm, preferably in the 420-450 nm range). Preferred optical brighteners have high fluorescence efficiency, i.e., re-emit as visible light a major proportion of the energy they have absorbed.

When the optical article has front and back main surfaces, its back surface is preferably not coated with any layer containing optical brighteners.

The chemical nature of the optical brightener is not particularly limited, provided that it is capable of emitting light by fluorescence, ideally a maximum fluorescence, at a wavelength ranging from 420 to 450 nm, in order to mask the yellow color imparted by the optical filtering means.

The optical brightener may be chosen, without limitation to these families, from stilbenes, carbostyrils, coumarins, 1,3-diphenyl-2-pyrazolines, naphthalimides, combined heteroaromatics (such as pyrenyl-triazines or other combinations of heterocyclic compounds such as thiazoles, pyrazoles, oxadiazoles, fused polyaromatic systems or triazines, directly connected to each other or through a conjugated ring system) benzoxazoles, in particular benzoxazoles substituted at the 2-position with a conjugated ring system, preferably comprising ethylene, phenylethylene, stilbene, benzoxazole and/or thiophene groups. Preferred families of optical brighteners are bis-benzoxazoles, phenylcoumarins, methylcoumarins and bis-(styryl)biphenyls, which are described in more details in A. G. Oertli, Plastics Additives Handbook, 6th Edition, H. Zweifel, D. Maier, M. Schiller Editors, 2009.

Other useful optical brighteners that may be used in the present invention are described in Fluorescent Whitening agents, Anders G. EQS, Environmental quality and safety (Suppl. Vol IV) Georg Thieme Stuttgart 1975. Specific examples of commercially available optical brighteners are disclosed in WO 2015/097186 and WO2015097492 in the name of the applicant and are incorporated herein by reference.

In systems according to the invention, the optical filtering means and/or the color-balancing means can be incorporated in the substrate of the optical article, in at least one coating at the surface of the substrate or in a layer interleaved between two substrate films. They can be incorporated both in the substrate, both in the same coating, e.g. a primer coating, a hard coating or an antireflection coating, or separately at different locations, for example one in the substrate and the other in a coating deposited on either face of the optical article (which may be convex, concave or flat), separately in (at least) two different coatings, or a combination of these embodiments can be implemented, while still obtaining the advantages and benefits of the invention in terms of health and cosmetic appearance. For example, the optical filtering means may be located in a hard coating, and the color-balancing means included in a primer coating, or the optical filtering means may be included in the substrate, and the color-balancing means included in a coating. In case the optical filtering means and the color-balancing means are included in (at least) two different coatings, these coatings are not necessarily deposited on the same face of the optical article. They can be deposited on either face of the optical article or on both faces of the optical article.

In one embodiment, the functionality to block blue light wavelengths and the functionality to perform color balancing are combined in a single component that blocks blue light wavelengths and reflects some green and red wavelengths.

Several optical filtering means and/or color-balancing means can be incorporated in the substrate and/or the same or different layers deposited at the surface of the substrate. In some embodiments, the optical filtering means is split between two filters, disposed on the same or different surfaces of the optical substrate.

The optical filtering means is preferably contained in the substrate of the optical article. Methods for incorporating an absorbing dye, an UV-absorber or a color-balancing means in the mass of the substrate of the optical article are well known and include, for example (see e.g. WO 2014/133111):

I. impregnation or imbibition methods consisting in dipping the substrate in an organic solvent and/or water based hot coloration bath, preferably a water based solution, for several minutes. Substrates made from organic materials such as organic lens substrates are most often colored in the bulk of the material by dipping in aqueous coloration baths, heated to temperatures of the order of 90° C., and in which the optical filtering means or color-balancing means has been dispersed. This compound thus diffuses under the surface of the substrate and the color density is obtained by adjusting the quantity of compound diffusing in the body of the substrate, II. the diffusion methods described in JP 2000-314088 and JP 2000-241601, involving an impregnable temporary coating, III. contactless coloration using a sublimable material, such as described in U.S. Pat. Nos. 6,534,443 and 6,554,873, or IV. incorporation of the compound during the manufacture of the substrate itself, for example by casting or injection molding, if it is sufficiently resistant to high temperatures present during casting or injection molding. This is preferably carried out by mixing the compound in the substrate composition (an optical material resin or a polymerizable composition) and then forming the substrate by curing the composition in an appropriate mold.

In another embodiment, the optical article comprises a substrate and at least one layer coated on the substrate, wherein the optical filtering means and/or the color-balancing means is incorporated into said at least one layer coated on the substrate. These compounds may be incorporated, for example, into a hard coating and/or a primer coating, which generally promotes adhesion of the hard coating to the substrate. They can also be incorporated into a film that will be subsequently transferred, laminated, fused or glued to the substrate.

Several methods familiar to those practiced in the art of optical manufacturing are known for incorporating the optical filtering means (and/or the color-balancing means) in a layer. These compounds may be deposited at the same time as the layer, i.e., when the layer is prepared from a liquid coating composition, they can be incorporated (directly or for example as particles impregnated by the compound) or dissolved in said coating composition before it is applied (in situ mixing) and hardened at the surface of the substrate.

The optical filtering means (and/or the color-balancing means) may also be included in a coating in a separate process or sub-process. For example, the compound may be included in the coating after its deposition at the surface of the substrate, using a dipping coloration method similar to that referred to for coloring the substrate, i.e., by means of tinting bath at elevated temperatures, through the diffusion method disclosed in US 2003/0020869, in the name of the applicant, through the method disclosed in US 2008/127432, in the name of the applicant, which uses a printing primer that undergoes printing using an inkjet printer, through the method disclosed in US 2013/244045, in the name of the applicant, which involves printing with a sublimation dye by means of a thermal transfer printer, or though the method disclosed in US 2009/047424, in the name of the applicant, which uses a porous layer to transfer a coloring agent in the substrate. The compound may also be sprayed onto a surface before the coating is cured (e.g., thermally or UV cured), dried or applied.

Obviously, combinations of several of the above described methods can be used to obtain an optical article having at least one optical filtering means and/or color-balancing means incorporated therein.

The amount of optical filtering means used in the present invention is an amount sufficient to provide a satisfactory protection from blue light, while the amount of color-balancing means used in the present invention is an amount sufficient to offset the yellowing effect caused by the optical filtering means.

Naturally, the respective amounts of color-balancing means and optical filtering means may be adapted to each other to produce a transparent, colorless element that does not have a yellow appearance. In particular, those of skill in the art should appreciate that the desired amount of color-balancing means will vary depending on several factors including the nature and amount of the optical filtering means that is used. To this end, the optimal amounts of each compound can be determined by simple laboratory experiments.

For example, the optical filtering absorbing dye can be used at a level of 0.005 to 0.150% based on the weight of the coating solution, depending on the strength of the absorbing dye and the amount of protection desired. In such cases, the color-balancing dye(s) can be used at a level of 0.01-0.10% based on the weight of the coating solution, depending on the strength of the dyes and the final color and % Transmission desired. It should be understood that the invention is not limited to these ranges, and they are only given by way of example.

Obviously, the optical article according to the invention can only appear colorless if neither of its substrate and coatings is tinted.

In some applications, it is preferred that the substrate's main surface be coated with one or more functional coating(s) to improve the optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer. These functional coatings classically used in optics may be, without limitation, an impact-resistant and/or adhesion primer, an abrasion-resistant and/or scratch-resistant coating, an anti-reflection coating, a polarized coating, a photochromic coating, or an antistatic coating, or a stack made of two or more such coatings, especially an impact-resistant primer coating coated with an abrasion and/or scratch-resistant coating.

Abrasion- and/or scratch-resistant coatings (hard coatings) are preferably hard coatings based on poly(meth)acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698, U.S. Pat. No. 4,211,823 and EP614957.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312.

The antireflection coating may be any antireflection coating traditionally used in the optics field, particularly ophthalmic optics. An antireflective coating is defined as a coating, deposited onto the surface of an optical article, which improves the antireflective properties of the final optical article. It makes it possible to reduce the light reflection at the article-air interface over a relatively large portion of the visible spectrum.

As is also well known, antireflection coatings traditionally comprise a monolayered or a multilayered stack composed of dielectric and/or sol-gel materials and/or organic/inorganic layers such as disclosed in WO2013098531. These are preferably multilayered coatings, comprising layers with a high refractive index (HI) and layers with a low refractive index (LI).

In the present application, a layer of the antireflective coating is said to be a layer with a high refractive index when its refractive index is higher than 1.55, preferably higher than or equal to 1.6, more preferably higher than or equal to 1.8 and even more preferably higher than or equal to 2.0. A layer of an antireflective coating is said to be a low refractive index layer when its refractive index is lower than or equal to 1.55, preferably lower than or equal to 1.50, more preferably lower than or equal to 1.45. Unless otherwise specified, the refractive indexes referred to in the present invention are expressed at 25° C. at a wavelength of 550 nm.

The HI and LI layers are traditional layers well known in the art, generally comprising one or more metal oxides, which may be chosen, without limitation, from the materials disclosed in WO 2011/080472.

Preferred HI layers comprise at least one material selected from the group consisting of zirconia ($ZrO_2$), titanium dioxide ($TiO_2$), tantalum pentoxide ($Ta_2O_5$), niobium oxide ($Nb_2O_5$), alumina ($Al_2O_3$), praseodymium oxide ($Pr_2O_3$), praseodymium titanate ($PrTiO_3$), silicon nitride and silicon oxynitride.

Preferred LI layers comprise at least one oxide chosen from silicon oxide, silica, mixtures of silicon oxide and alumina. When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to $SiO_2+Al_2O_3$ total weight in this layer. The antireflective coating outer layer is preferably a LI layer, more preferably a silica-based layer.

Typically, HI layers have a thickness ranging from 10 to 120 nm, and LI layers have a thickness ranging from 10 to 100 nm.

Preferably, the antireflection coating total thickness is lower than 1 micron, more preferably lower than or equal to 800 nm and even more preferably lower than or equal to 500 nm. The antireflective total thickness is generally higher than 100 nm, preferably higher than 150 nm.

Still more preferably, the antireflective coating comprises at least two layers with a low refractive index (LI) and at least two layers with a high refractive index (HI). Preferably, the total number of layers in the antireflective coating is lower than or equal to 8, more preferably lower than or equal to 6, and preferably higher than or equal to 4.

HI and LI layers do not need to alternate with each other in the antireflective coating, although they also may, according to one embodiment of the invention. Two HI layers (or more) may be deposited onto each other, as well as two LI layers (or more) may be deposited onto each other.

Coatings such as primers, hard coats and antireflection coatings according to the invention may be deposited using methods known in the art, including spin-coating, dip-coating, spray-coating, evaporation, sputtering, chemical vapor deposition and lamination.

The various layers of the antireflective coating are preferably deposited according to any one of the methods disclosed in WO 2011/080472, which is hereby incorporated by reference. A particularly recommended method is evaporation under vacuum.

The structure and preparation of antireflection coatings are also described in more details in patent application WO 2010/109154 and WO 2012/153072.

In one embodiment of the invention, the rear main face of the optical article, the front main face of the optical article, or both, are coated with an antireflective coating, preferably a multilayer one, such that the luminous reflection factor on said rear main face and/or on said front main face in the visible region $R_v$ is lower than or equal to 2.5%.

In another embodiment of the invention, the rear main face of the optical article, the front main face of the optical article, or both, are coated with an antireflective coating, preferably a multilayer one, such that the mean reflection factor on said rear main face and/or on said front main face in the visible region $R_m$ is lower than or equal to 2.5%.

In some aspects of the invention, the optical article has an $R_v$ factor and/or an $R_m$ factor lower than or equal to 2%, 1.5%, 1%, 0.8% or 0.6% on at least one main face, preferably both on said rear main face and on said front main face.

The means to reach such $R_v$ and $R_m$ values are well known from the person skilled in the art.

$R_v$, which is also called "luminous reflection factor", is such as defined in the ISO standard 13666:1998, and is measured according to the ISO 8980-4 standard (for an angle of incidence lower than 17°, typically of 15°), that is to say this is the weighted spectral reflection average over the whole visible spectrum between 380 and 780 nm.

In the present application, the "mean reflection factor," noted $R_m$, is such as defined in the ISO 13666:1998 Standard, and measured in accordance with the ISO 8980-4 standard (for an angle of incidence lower than 17°, typically of 15°), i.e., this is the (non-weighted) spectral reflection average over the whole visible spectrum between 400 and 700 nm.

In the present application, $R_v$ and $R_m$ factors have been measured at an angle of incidence of 15°.

Preferably, the above described antireflective coatings block less than 2.5% of the light having a wavelength ranging from 420 to 450 nm arriving on the front main face of the optical article, by absorption and/or reflection.

In some aspects, the present invention provides an optical article further comprising a sub-layer, deposited before the antireflective coating, said sub-layer having preferable a refractive index lower than or equal to 1.55. The sub-layer is generally less than 0.5 micrometer thick and more than 100 nm thick, preferably more than 150 nm thick, more preferably the thickness of the sub-layer ranges from 150 nm to 450 nm. In another embodiment, the sub-layer comprises, more preferably consists in, silicon oxide, even better silica. Examples of usable sub-layers (mono or multilayered) are described in WO 2012/076174.

In some embodiments, the antireflective coating of the invention includes at least one electrically conductive layer. In a particular embodiment, the at least one electrically conductive layer has a refractive index greater than 1.55. The at least one electrically conductive layer serves as an antistatic agent. Without being bound by theory, the at least one electrically conductive layer prevents the multilayer antireflective coating stack from developing and retaining a static electric charge.

The ability for a glass to evacuate a static charge obtained after rubbing with a piece of cloth or using any other procedure to generate a static charge (charge applied by corona) may be quantified by measuring the time it takes for said charge to dissipate. Thus, antistatic glasses have a discharge time of about a few hundred milliseconds (ms), preferably 500 ms or less, whereas it is of about several tens of seconds for a static glass. In the present application, discharge times are measured according to the method disclosed in FR 2943798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the anti-reflective properties thereof are not affected. It is preferably located between two layers of the antireflective coating, and/or is adjacent to a layer with a high refractive index of such antireflective coating. Preferably, the electrically conductive layer is located immediately under a layer having a low refractive index, most preferably is the penultimate layer of the antireflective coating by being preferably located immediately under a silica-based outer layer of the antireflective coating.

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer or a tin oxide layer.

The optical article of the invention can also be configured to reduce reflection in the UVA- and UVB-radiation range, in addition to reducing reflection in the visible region, so as to allow the best health protection against UV and harmful blue light.

Amongst the UV bands that reach the earth surface, UVA band, ranging from 315 nm to 380, and UVB band, ranging from 280 nm to 315 nm, are particularly harmful to the retina. Traditional antireflective coatings are designed and optimized to reduce reflection on the lens surface in the visible region, typically within the spectrum range of from 380 to 780 nm. As a rule, the reflection in the ultraviolet region (280-380 nm) is not optimized, and is frequently reinforced by the traditional antireflective coating itself.

UV radiation coming from the front of the wearer is generally not problematic, but UV radiation resulting from light sources located behind the wearer may reflect on the lens rear face and reach the wearer's eye if the lens is not provided with an antireflective coating which is efficient in the ultraviolet region, thus potentially affecting the wearer's health. It is admitted that the light rays that may reflect onto the lens rear face and reach the wearer's eye have a narrow incidence angle range, ranging from 30 to 45° (oblique incidence).

In one embodiment of the invention, the optical article comprises on its rear main face, and optionally on its front main face, an anti-UV, antireflective coating possessing very good antireflective performances in the visible region, and which is at the same time capable of significantly reducing the UV radiation reflection, especially ultraviolet A- and ultraviolet B-rays, as compared to a bare substrate or to a substrate comprising a traditional antireflective coating.

The mean reflection factor $R_{UV}$ on the rear main face between 280 nm and 380 nm, weighted by the function $W(\lambda)$ defined in the ISO 13666:1998 standard, is preferably lower than 5%, more preferably lower than or equal to 4.5%, even better lower than or equal to 4%, for an angle of incidence of 35° (on the rear face). In another embodiment, the mean reflection factor $R_{UV}$ on the rear main face between 280 nm and 380 nm, weighted by the function $W(\lambda)$ defined in the ISO 13666:1998 standard, is preferably lower than 5% for both an angle of incidence of 30° and for an angle of incidence of 45°. Said mean reflection factor $R_{UV}$ is defined through the following relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ represents the lens spectral reflection factor at a given wavelength, and $W(\lambda)$ represents a weighting function equal to the product of the solar spectrum irradiance $Es(\lambda)$ and the efficiency relative spectral function $S(\lambda)$. In certain embodiments, this factor may be measured at an angle of incidence that ranges from 30° to 45° on the rear face.

The spectral function $W(\lambda)$, enabling to calculate the ultraviolet radiation transmission factors, is defined according to the ISO 13666:1998 Standard. It makes it possible to express the ultraviolet solar radiation distribution tempered by the relative spectral efficiency of such radiation for the wearer, since it simultaneously takes both the solar spectral energy $Es(\lambda)$ into account, which does globally emit less UVB-rays as compared to UVA-rays, and the spectral efficiency $S(\lambda)$, UVB-rays being more harmful than UVA-rays. The values for those three functions in the ultraviolet region are given in the table disclosed at page 6 of the publication WO 2012/076714.

In some embodiments, the above anti-UV performances are provided by the antireflection coating while maintaining a $R_v$ factor on the rear main face and/or on the front main face lower than or equal to 2.5%.

The optical article according to the invention may also comprise coatings formed on an antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm. They are generally coatings of the fluorosilane or fluorosilazane type. They may be obtained by depositing a fluorosilane or fluorosilazane precursor, comprising preferably at least two hydrolysable groups per molecule. Fluorosilane precursors preferably comprise fluoropolyether moieties and more preferably perfluoropolyether moieties.

Optool DSX™, KY130™, OF210™, Aulon™ are examples of hydrophobic and/or oleophobic coatings. More detailed information on these coatings is disclosed in WO 2012076714.

The invention also relates to the use of the above described optical article for protecting at least part of an eye of a user from phototoxic blue light, stated otherwise light having a wavelength ranging from 420 to 450 nm.

Hereafter are features that can be combined with the specific features of the invention already described in the present application.

An embodiment of the invention is an optical article comprising at least one optical filtering means which is an absorbing dye A that selectively and at least partially blocks transmission of light having a wavelength ranging from 400 to 500 nm, wherein dye A has an absorption peak in the range from 400 nm to 460 nm and the absorption spectrum of the optical article is such that the contribution to absorption in the range 400-435 nm is higher than in the range 435-460 nm In an embodiment, the absorption spectrum of the optical article is such that the ratio R1 of the area under the curve (absorption curve) from 435 to 460 nm and the area under the curve from 400 to 435 nm is lower than 0.7.

In another embodiment, the absorption spectrum of the optical article is such that the ratio R1 of the area under the curve between 435 and 460 nm and the area under the curve between 400 and 435 nm is lower than 0.6.

The absorption spectrum is obtained from transmittance values T of the optical article for each wavelength in the 380-780 nm wavelength range measured by a spectrophotometer and then the transmittance values of the optical article are converted in absorbance data A using the formula: $A = 2 - \log_{10} \% T$.

Then the absorbance spectrum can be represented. The absorbance values of the optical article take into account all blue blocking due to reflection at the different interfaces (especially at the interface substrate/air) and absorption due to the materials of the optical article (substrate materials, coatings, . . . ). A spectrophotometer can also be programmed to give direct values of absorbance.

Preferably dye A has an absorption peak in the range from 400 nm to 428 nm, preferably in the range from 415 nm to 428 nm.

Preferably dye A has an absorption peak that exhibits a full width at half maximum lower than or equal to 40 nm.

Preferably, the optical article comprises at least one color balancing dye B having an absorption peak at a wavelength higher than or equal to 500 nm, B being preferably an anthraquinone.

diameter, a refractive index of 1.50, a power of −2.00 diopters and a thickness of 1.2 mm, coated on the front side with coatings 1 to 5 and comparative 1 to 4 comprising an absorbing dye or an UV absorber for at least partially inhibiting light having a wavelength ranging from 420 to 450 nm, and optionally a second dye or mixture of dyes acting as a color balancing means. The concentration of these dyes were adjusted to obtain the desired b* and a* colorimetric coefficients and the desired level of blue light blocking in the 420-450 nm range. See table 1 hereafter.

The blue light blocking absorbing dye ABS420 provided a selective absorptive optical filtering means. Said dye had an absorption peak centered at around 421 nm in the coating.

TABLE 1

| Chemical coating formula | Example | | | | | | | | |
|---|---|---|---|---|---|---|---|---|---|
| | 1 Wt. % | 2 Wt. % | 3 Wt. % | 4 Wt. % | 5 Wt. % | Comp 1 Wt. % | Comp 2 Wt. % | Comp. 3 Wt. % | Comp. 4 Wt. % |
| N-methyl pyrrolidone | 27.606 | 27.610 | 27.615 | 27.620 | 27.746 | 27.8 | 27.608 | 27.608 | 27.611 |
| ABS420 (Exciton)absorbing dye 1 | 0.0087 | 0.009 | 0.017 | | | | | 0.017 | 0.027 |
| SDA-4820 (absorbing dye 2) | | | | 0.016 | | | 0.016 | | |
| Tinuvin Carboprotect ™ (BASF) (UV absorber) (blue filtering) | | | | | 0.982 | 1.393 | | | |
| Irganox 245 (UV stabilizer) | 0.0029 | 0.009 | 0.015 | 0.021 | | | 0.005 | 0.006 | 0.009 |
| Tinuvin 144 (UV stabilizer) | 0.0029 | 0.009 | 0.015 | 0.021 | | | 0.005 | 0.006 | 0.009 |
| D&C Violet #2 (color balancing dye) | | 0.007 | 0.018 | 0.046 | | | | | |
| Morplas Blue (color balancing dye) | | 0.011 | 0.011 | 0.003 | | | | | |
| Trixene BI7960 | 33.118 | 33.103 | 33.086 | 33.070 | 32.614 | 32.400 | 33.112 | 33.111 | 33.102 |
| Duranol T5652 | 17.369 | 17.362 | 17.353 | 17.344 | 17.105 | 16.993 | 17.366 | 17.366 | 17.361 |
| Poly(meth)acrylic polyol | 19.227 | 19.218 | 19.209 | 19.199 | 18.935 | 18.810 | 19.224 | 19.223 | 19.218 |
| A-187 | 2.0957 | 2.095 | 2.093 | 2.092 | 2.059 | 2.044 | 2.095 | 2.095 | 2.095 |
| BYK 333 | 0.0397 | 0.040 | 0.040 | 0.040 | 0.039 | 0.039 | 0.040 | 0.040 | 0.040 |
| Metal complex catalyst | 0.5290 | 0.529 | 0.528 | 0.528 | 0.520 | 0.516 | 0.529 | 0.529 | 0.529 |
| Total | 100 | 100 | 100 | 100 | 100 | 100 | 100 | 100 | 100 |

Preferably, dye A has a specific absorption coefficient higher than 200 $L \cdot g^{-1} \cdot cm^{-1}$ in methylene chloride, preferably higher than 300 $L \cdot g^{-1} \cdot cm^{-1}$, more preferably higher than 400, 500, 600 $L \cdot g^{-1} \cdot cm^{-1}$.

Preferably, the optical article has an absorption spectrum such that the ratio R2 of the area under the curve from 460 to 700 nm to the area under the curve from 400 to 460 nm is lower than or equal to 2.25.

The following examples illustrate the present invention in a more detailed, but non-limiting manner. Unless stated otherwise, all thicknesses disclosed in the present application relate to physical thicknesses.

EXAMPLES

The optical articles used in the examples comprise an ORMA® lens substrate from ESSILOR, having a 65 mm On this 12 µm thick coating incorporating both the optical filtering means and color balancing means if any, was deposited an 8 µm intermediate coating such as described in example 1 table 1 of U.S. Pat. No. 7,410,691.

Then were deposited, in this order, on the intermediate coating, a polyurethane impact resistant primer coating (W234™) thickness of about 1 µm, an abrasion resistant coating corresponding to example 3 of EP614957 of around 2.5 µm and an antireflective coating comprising a 150 nm thick $SiO_2$ sub-layer, a 28 nm thick $ZrO_2$ layer, a 22 nm thick $SiO_2$ layer, a 72 nm thick $ZrO_2$ layer, a 6 nm thick antistatic layer composed of indium-tin oxide, and a 84 nm thick $SiO_2$ layer.

The rear main face of the lens was only coated with the primer layer W234™, the abrasion resistant coating as described above and anti-UV antireflective coating comprising a 150 nm thick $SiO_2$ sub-layer, a 19 nm thick $ZrO_2$ layer, a 23 nm thick $SiO_2$ layer, a 93 nm thick $ZrO_2$ layer, a 6.5 nm thick antistatic layer composed of indium-tin oxide, and a 82 nm thick $SiO_2$ layer. Said coating has an $R_v$ of 0.59% and an $R_{UV}$ of 2.59% at 30° and 3.1% at 45°.

Optical Performances

The optical performances of the lenses were measured using an UltraScan Pro spectrophotometer from Hunter and are shown in the table below, where % blue cut (420-450 nm) represents the % of light blocked having a wavelength ranging from 420 to 450 nm arriving on the front main face of the optical article. % blue cut (420-450 nm)=100-% average transmission at 420-450 nm.

|  | Example | | | | | | | | |
|---|---|---|---|---|---|---|---|---|---|
|  | 1 | 2 | 3 | 4 | 5 | Comp. 1 | Comp. 2 | Comp. 3 | Comp. 4 |
| Absorbing Dye | Dye 1 | Dye 1 | Dye 1 | Dye 2 | No | No | Dye 2 | Dye 1 | Dye 1 |
| UV absorber | No | No | No | No | Yes | Yes | No | No | No |
| Color balancing agent | No | Yes | Yes | Yes | No | No | No | No | No |
| Tv (%) | 97.8 | 95.5 | 90.5 | 90.3 | 98.4 | 97.6 | 98.2 | 96.5 | 95.1 |
| b* | 3.03 | 1.80 | 2.47 | 2.11 | 3.79 | 6.98 | 6.83 | 5.60 | 8.23 |
| a* | −0.99 | −1.34 | −2.38 | −2.11 | −1.66 | −3.11 | −2.57 | −1.85 | −2.54 |
| % average transmission at 420-450 nm | 86.1 | 85.9 | 74.5 | 82.5 | 89.8 | 80.4 | 82.4 | 75.8 | 65.1 |
| % blue cut (420-450 nm) | 13.9 | 14.1 | 15.5 | 17.5 | 10.2 | 19.6 | 17.6 | 24.2 | 34.9 |
| % average transmission at 465-495 nm | 98.3 | 97.6 | 95.5 | 95.4 | 98.4 | 97.6 | 97.3 | 97.0 | 98.3 |

The results show that the optical articles according to the invention selectively block at least 10% of the harmful blue light (420-450 nm) and transmit at least 95% of the blue light implicated in circadian rhythms (465-495 nm).

Sensory Analysis

The lenses as prepared above were evaluated by a panel of 15 trained judges having at least a vision such that they have a notation of 0.8 at the Monoyer test (i.e. they are able to read line 0.8).
The rooms were the sensory analyses are made respect the standard AFNOR NF V 09-15. The ISO standard 13299: 2003 is used.
Judges are selected and formed in accordance with ISO8586 standard.

The lighting in the rooms is corresponding to a D65 lighting.
Also, light spots are corresponding to white light.
The methodology used is the following:
1) Comparative presentation of the samples,
2) Evaluation of the products in a randomized order (Latin Squares) to avoid perturbations due to order effect,
3) The products were anonymized by being identified only by a 3-digit code.

The transparency of the lens criterion has been studied, on the wearer's or observer's point of view.

Transparency of the Lens (Wearer):

Definition: which allows the light to get through and let appear with sharpness the eyes of the wearer.

Protocol: The wearer looks himself or herself in the mirror and evaluates the transparency of the lens by looking if he or she sees his (her) eyes clearly. Scale: from 0 (not transparent) to 10 (very transparent).

Transparency of the Lens (Observer):

Definition: which allows the light to get through and let appear with sharpness the eyes of the wearer.

Protocol: The evaluator looks at a person in front of him (her) and evaluates the transparency of the lens by looking if the eyes of the person are seen clearly. Scale: from 0 (not transparent) to 10 (very transparent)

The results shown below demonstrate that an optical article having a neutral color with a lower transmission (Tv ranging from 90.3% to 95.5%, b* ranging from 1.8 to 2.47, examples 2, 3, 4) is seen as more transparent by the wearer and/or observer than an optical article having a yellow color with a higher transmission (Tv ranging from 95.1% to 98.2%, b* ranging from 5.60. to 8.23 comp. 1 to comp. 4).

|  | Example | | | | | | | | |
|---|---|---|---|---|---|---|---|---|---|
|  | 1 | 2 | 3 | 4 | 5 | Comp. 1 | Comp. 2 | Comp. 3 | Comp. 4 |
| Transparency of the lens for the WEARER | 6.62 | 7.48 | 5.44 | 5.33 | 5.82 | 3.61 | 4.49 | 5.11 | 3.41 |
| Transparency of the lens for the OBSERVER | 7.36 | 8.08 | 7.15 | 6.45 | 6.58 | 5.03 | 5.07 | 5.85 | 4.65 |
| Tv (%) | 97.8 | 95.5 | 90.5 | 90.3 | 98.4 | 97.6 | 98.2 | 96.5 | 95.1 |
| b* | 3.03 | 1.80 | 2.47 | 2.11 | 3.79 | 6.98 | 6.83 | 5.60 | 8.23 |

The invention claimed is:
1. An optical article comprising a substrate with a front main face and a rear main face, defined as:
having a colorimetric coefficient b* as defined in the CIE (1976) L*a*b* international colorimetric system that is lower than or equal to 3, having a relative light transmission factor in the visible spectrum Tv higher than or equal to 87%, blocking at least 8% of light having a wavelength ranging from 420 to 450 nm arriving on said front main face, with at least one optical filtering means, which is an absorbing dye A that selectively and at least partially blocks transmission of light having a wavelength ranging from 400 to 500 nm, wherein dye A has an absorption peak:

in the range from 415 nm to 428 nm, and that exhibits a full width at half maximum lower than or equal to 40 nm, and the absorption spectrum of the optical article is such that the contribution to absorption in the range 400-435 nm is higher than in the range 435-460 nm, said rear main face and said front main face are coated with a multilayered antireflective coating, the mean light reflection factor on said rear main face and on said front main face in the visible region $R_v$ being lower than or equal to 2.5%, and the optical article comprises at least one color balancing dye B having an absorption peak at a wavelength higher than or equal to 500 nm.

2. The optical article of claim 1, further defined as transmitting at least 95% of light having a wavelength ranging from 465 to 495 nm.

3. The optical article of claim 1, having a relative light transmission factor in the visible spectrum Tv ranging from 87% to 98.5%.

4. The optical article of claim 1, further defined as blocking at least 12% of the light having a wavelength ranging from 420 to 450 nm arriving on said front main face.

5. The optical article of claim 1, comprising at least one optical filtering means that at least partially blocks light having a wavelength ranging from 420 to 450 nm.

6. The optical article of claim 5, wherein the optical filtering means comprises at least one absorbing dye and/or UV absorber.

7. The optical article of claim 1, having a mean light reflection factor in the visible region $R_v$ lower than or equal to 0.6% on at least one main face.

8. The optical article of claim 1, having a mean light reflection factor in the visible region $R_v$ lower than or equal to 0.6% on said rear main face and on said front main face.

9. The optical article of claim 1, wherein the mean reflection factor $R_{UV}$ on said rear main face between 280 nm and 380 nm, weighted by the function $W(\lambda)$ defined in the ISO 13666:1998 standard, is lower than 5%, for an angle of incidence of 35°.

10. The optical article of claim 1, further defined as an ophthalmic lens.

11. The optical article of claim 1, having a colorimetric coefficient a* as defined in the CIE (1976) L*a*b* international colorimetric system that is lower than or equal to 3.

12. The optical article of claim 1, having a colorimetric coefficient a* as defined in the CIE (1976) L*a*b* international colorimetric system that is higher than or equal to −5.

13. The optical article of claim 12, having a colorimetric coefficient a* as defined in the CIE (1976) L*a*b* international colorimetric system that ranges from −5 to −1.

14. The optical article of claim 1, having a relative light transmission factor in the visible spectrum Tv ranging from 87% to 97%.

15. The optical article of claim 1, having a relative light transmission factor in the visible spectrum Tv ranging from 87% to 96%.

16. A process for protecting at least part of an eye of a user from phototoxic blue light, comprising the use of an optical article of claim 1.

* * * * *